April 4, 1950
H. F. RUSCHMANN
2,502,890
FILM CLIP
Filed Feb. 7, 1947
2 Sheets-Sheet 1
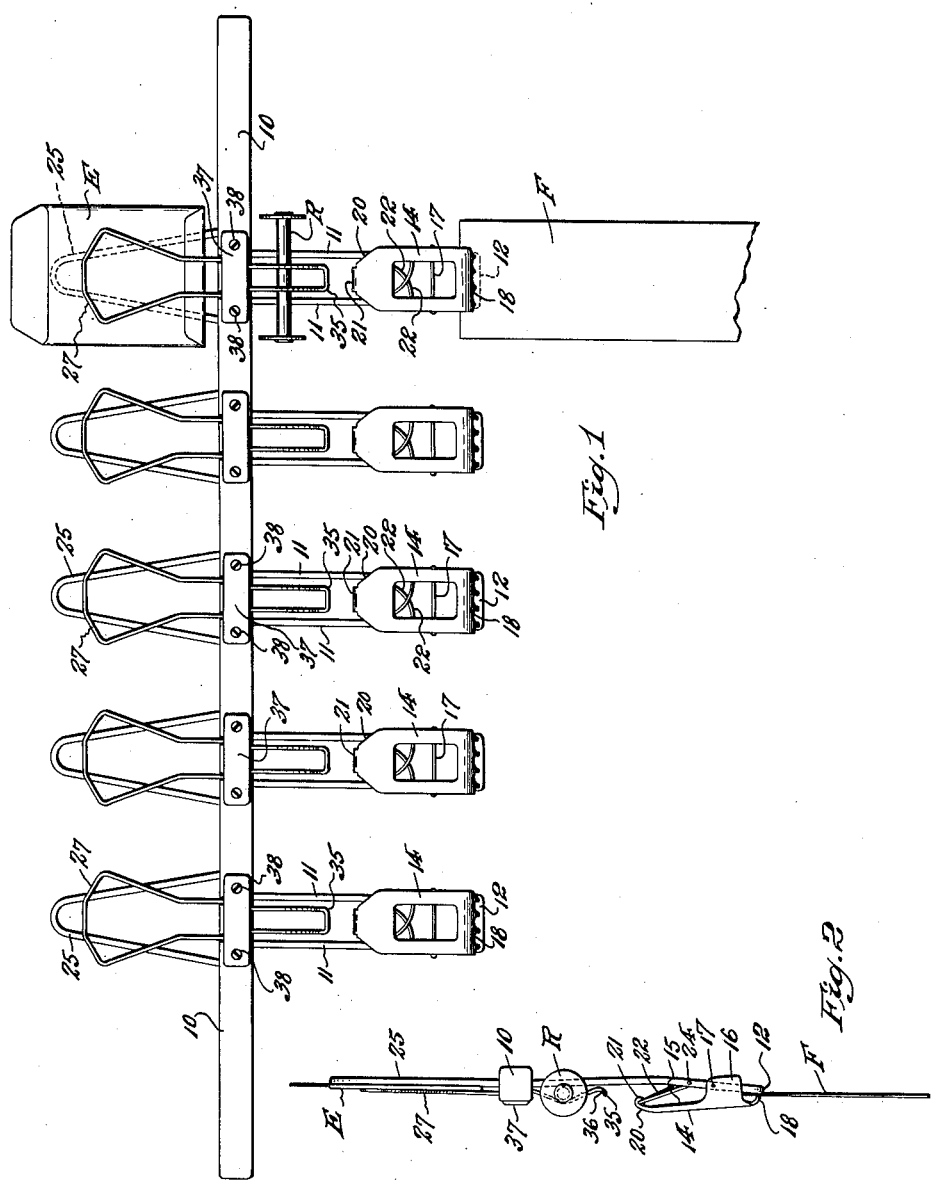
INVENTOR.
Henry F. Ruschmann,
BY
George D. Richards
Attorney

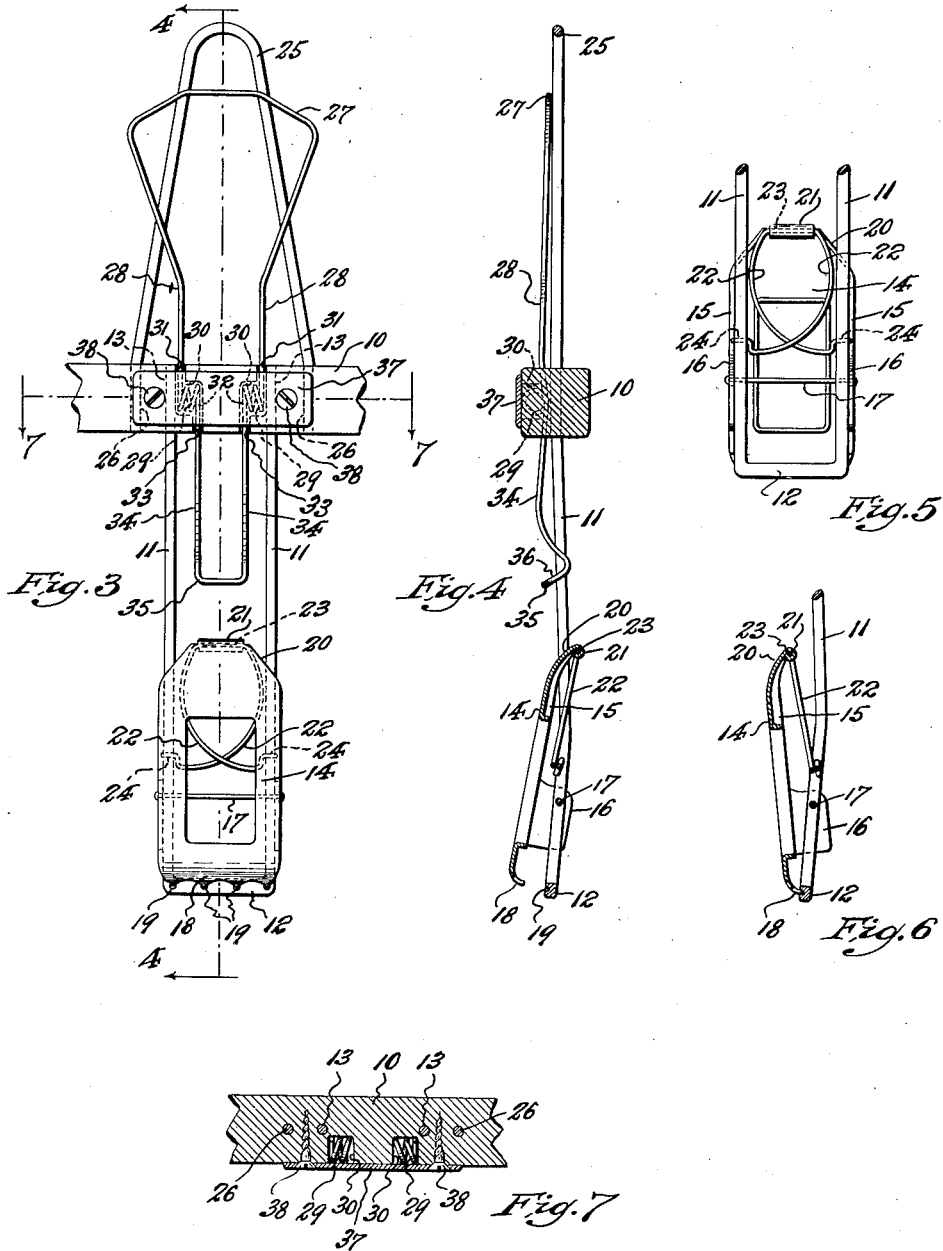

Patented Apr. 4, 1950

2,502,890

UNITED STATES PATENT OFFICE 2,502,890

FILM CLIP

Henry F. Ruschmann, Bernardsville, N. J.

Application February 7, 1947, Serial No. 727,031

2 Claims. (Cl. 24—252)

An industry of considerable proportions is involved in the developing of exposed photographic films, especially roll films, for amateur photographers, in the operation of which not only are a great number of films required to be speedily processed, but also handled in such manner in the process as to remain identified at all times as the property of the amateur for whom the service is rendered.

In the handling of films for development thereof, it is the practice to simultaneously process a number of film rolls or strips at one time, and at the same time maintain ownership identification of each film roll or strip throughout the process. To facilitate such practice, film suspension racks or hangers, for suspending the film rolls or strips in developer, washing, and fixing solution tanks, having means to also hold identifying data relating to the respective film rolls or strips have been utilized. It is an object of this invention to provide an improved and simplified construction of film suspension rack or hanger for this purpose.

Another object of the invention is to provide an improved film suspension rack or hanger including a novel construction of easily and quickly manipulatable clip or clasp for releasably attaching the film rolls or strips to the rack or hanger.

A further object of the invention is to provide a spring clip or clasp structure for the stated and other purposes, which comprise a stationary jaw member and an associated pivoted jaw member, and novel intermediate spring means having a toggle-like relation thereto, whereby said spring means is adapted, in one position, to hold the pivoted jaw member in open relation to the stationary jaw member, and, in another position, to hold said pivoted jaw member in closed relation to said stationary jaw member.

Other objects of this invention, not at this time more particularly enumerated, will be understood from the following detailed description of the same.

An illustrative embodiment of the invention is shown in the accompanying drawings, in which:

Fig. 1 is a face view of the novel film roll or strip suspension rack or hanger according to this invention; and Fig. 2 is an end elevational view thereof, viewed from the right in Fig. 1.

Fig. 3 is an enlarged face view of one section of the holding elements of the suspension rack or hanger; Fig. 4 is a vertical longitudinal sectional view, taken on line 4—4 in Fig. 3, with the clip structure shown in open condition.

Fig. 5 is a rear face elevational view of the clip structure of Fig. 3; and Fig. 6 is a vertical longitudinal sectional view of said clip structure, shown in closed condition.

Fig. 7 is a fragmentary horizontal sectional view, taken on line 7—7 in Fig. 3.

Similar characters of reference are employed in the hereinabove described views, to indicate corresponding parts.

Referring to the drawings, the reference character 10 indicates the horizontal bar of a film suspension rack or hanger, the same having spaced therealong a plurality of film suspension clips and correlated holding means for associated material relating to the films which are gripped and suspended by said clips.

Each film suspension clip comprises a U-shaped stationary jaw member which is formed by parallelly spaced perpendicular legs 11 which terminate, at their lower ends, in an interconnecting transverse portion or bar 12 adapted to provide the jaw piece of said stationary jaw member. The upper end or shank portions 13 of said legs 11 extend upwardly through the rack or hanger bar 10 so as to be imbedded and fixed therein, whereby to dispose said stationary jaw member in depending relation to said rack or hanger bar. The stationary member thus is substantitally flat in form with bar 12 lying substantially in the plane of legs 11. The movable jaw member of the clip comprises a substantially rectangular body plate 14, which is preferably made of sheet metal suitably reenforced and stiffened against distortion by marginal flanges 15 which project rearwardly from its longitudinal sides. Projecting from the sides of the body plate 14, at points intermediate the ends thereof, preferably as extensions of the stiffening flanges 15, are hinging ears or lugs 16. Said body plate 14 is preferably of such width as to space apart the hinging lugs or ears 16 at a distance substantially corresponding to the external width of the spaced legs 11 of the stationary jaw member, so that said hinging ears or lugs will respectively lie contiguous to outer sides of said legs 11 of the stationary jaw member. The movable jaw member is pivotally connected with the stationary jaw member by means of a transverse pintle 17 adapted to extend through the ears or lugs 16 of the former and the legs 11 of the latter, or by any other suitable form of pivotal connection between said parts. Pintle 17 thus lies substantially in the plane of the flat stationary member. The lower end of said body plate 14 terminates in a rearwardly projected serrated jaw piece 18, which is opposed to the jaw piece 12 of said stationary jaw member. It is desirable that the jaw piece 12 of the stationary jaw member be provided with indentations or seats 19 which are respectively aligned with the teeth of the jaw piece 18 of the movable jaw member for cooperation therewith. At its upper end said body plate 14 is provided with a rearwardly projected portion 20 of less width than the internal width of the spaced lugs 11 of the stationary jaw member, said portion being preferably of tapered form as shown. Said upper end portion 29 of the body plate terminates in a transverse tubular bearing barrel 21, or other suitable means for engaging therewith an actuating spring means with which the clip is provided.

A spring means which is tensionally compressible in the direction of its length is connected in a toggle-like relation between the upper end portion 20 of the movable jaw member and the stationary jaw member, the points of connection with the latter being offset an appreciable distance from the pivotal fulcrum of the movable member toward the upper end thereof, so as to be eccentric to said pivotal fulcrum.

The described form of the movable jaw member and its pivotal relation to the stationary jaw member is such that the upper end portion of the former may swing in and out across a plane perpendicular to its pivot connection with said stationary jaw member and to the point of connection of the spring means with the latter. By reason of such relation, taken together with the eccentric relation of the bearing of the spring means as connected with the stationary jaw member and between the same and the upper end portion of the movable jaw member, the spring means is also capable of swinging in and out across a perpendicular dead center plane, whereby to be tensionally compressed longitudinally as it crosses said dead center plane. The axis of pintle 17 and the points of connection of the spring means with the stationary jaw member lie in a vertical, or perpendicular, plane. Therefore, this particular plane will be meant by the term "dead center plane" as used in the specification and claims. As a consequence of this, once the dead center plane is crossed upon inward swing of the spring means, the resultant stored tension of the latter will exert a thrust upon the upper end of the movable jaw member operative to move and yieldably hold the same in-swung, and thus its jaw piece 18 out-swung to open relation to the jaw piece 12 of the stationary jaw member (see Fig. 4). Conversely, once the dead center plane is crossed upon outward swing of the spring means, the stored tension of the latter will exert a thrust upon the upper end of the movable jaw member operative to move and yieldably hold the same outswung, and thus its jaw piece 18 in-swung to closed relation to the jaw piece 12 of the stationary jaw member (see Fig. 6).

It will be obvious that the form of the actuating spring means, adapted to be connected in the above described operative relation to and between the movable and stationary jaw members of the clip, is subject to wide variation. A preferred form of said spring means, as shown, comprises a length of spring wire which is bent upon itself to provide arcuate spring arms 22 and an intermediate transverse pivoting section 23. Said pivoting section 23 extends through the bearing barrel 21, with which the upper end portion 20 of the movable jaw member is provided, so as to be journaled therein. The arcuate spring arms 22 terminate in journal elements 24 which are respectively engaged in transverse bearing openings with which the respective legs 11 of the stationary jaw member are provided, which bearing openings are spaced upwardly from the point of pivotal connection of said movable member with the legs 11 of said stationary jaw member; i. e. at points offset from said pivotal connection and intermediate the same and the upper end portion of said movable jaw member so that the arc of swing of the spring means is eccentric to the arc of swing of the upper end portion of the movable jaw member. The arcuate spring arms 22 preferably cross each other so as to respectively extend from the bearing barrel 21 at one side of the movable jaw member to a leg 11 of the stationary jaw member at the opposite side thereof. It will be obvious that as the upper end or manipulating portion of the movable jaw member is swung in and out, as the case may be, across a dead center in the plane perpendicular to the pivotal connection of said movable jaw member, the spring arms 22 will likewise be swung across a dead center in plane perpendicular to the pivotal connections of their journal elements 24, and in so crossing dead center will be tensionally compressed longitudinally, whereby stored tension will exert thrust upon the movable jaw member operative to move and hold its upper end portion in either in-swung or out-swung position, as the case may be, and for the purposes already above set forth.

A marked advantage of the described clip structure lies in the fact that it is selectively self-sustained in either open or closed position to which it is manually moved; and, furthermore, since once dead center of movement is crossed, the actuating spring means acts to complete the movement of the movable jaw member of the clip. By reason of this, the user does not have to hold the clip open when inserting the end of a film strip therein, and once the latter is positioned between the jaw pieces 12 and 18, the clip may be quickly and easily closed by light finger pressure applied by the user against the lower portion of the movable jaw member. The clip is easily opened again by application of finger pressure against the upper manipulating portion of the movable jaw member. Closing operation may be accomplished just as easily by applying pressure in reverse direction to the upper, manipulating portion. The clip therefore provides a very simple and easily manipulatable means for grasping a film strip F desired to be suspended therefrom in the manner shown at the right hand end of Fig. 1 and in Fig. 2.

Mounted on the rack or hanger bar 10, in correlation with each film suspension clip thereof, is means for releasably holding material desired to be kept in association with particular film strips F suspended by said clips; such e. g. as envelopes E or other means bearing identification of the owners of the film strips or other pertinent data desired to be correlated with said film strips. Each means for such purpose includes an upstanding stationary back frame or bracket 25, which, in the preferred form shown, comprises an inverted substantially U-shaped member, the end portions 26 of the legs of which extend into the body of the rack or hanger bar 10 in suitably imbedded and affixed relation thereto. Cooperative with said back frame 25 is a yieldable or resilient gripper means. Said gripper means comprises a spring wire formation shaped to provide an upstanding gripper loop 27 having laterally spaced leg portions 28 which terminate in torsional coiled spring sections 29. Opening outwardly from the front face of the rack or hanger bar 10 are seating chambers or cavities 30 which are spaced conformably to the spacing of said coiled spring sections 29, so that the latter may be housed therein, with the leg portions 28 of the gripper loop 27 extending through passage channels 31 which lead upwardly and outwardly from said chambers or cavities 30. Extending from the ends of said coiled spring sections 29, opposite to the connections therewith of the leg portions 28 of the gripper loop 27, are legs 32 which engage in passage channels 33 which lead downwardly and outwardly from said chambers or cavities 30 of the rack or hanger bar 10. If desired, said legs 32 are extended to form leg portions 34 of a U-shaped additional gripper loop 35 which depends from the rack or hanger bar 10 intermediate and for cooperation with the upper portions of the legs 11 of the clip stationary jaw member to which the holding means is related. The leg portions 34 of said gripper loop 35 are preferably outwardly bowed intermediate their ends and terminate in an outwardly and downwardly inclined tongue portion 36 formed by the closed free end portion of said gripper loop 35, as clearly shown in Figs. 2 and 4. Each holding means thus constituted is held in operative assembled relation to the rack or hanger bar 10 by a retainer plate 37 which bridges and closes the open fronts of the chambers or cavities 30 and the passage channels 31 and 33 which communicate therewith, whereby to retain the coiled spring sections 29 in said chambers or cavities. Each retainer plate 37 is affixed to the front face of the rack or hanger bar 10 by screws 38 or other suitable fastening means.

The tensional torque of the coiled spring sections 29 is applied to the respective gripper loops 27 and 35, whereby to yieldably urge the gripper loop 27 toward the stationary back frame or bracket 25, and the gripper loop 35 toward the legs 11 of the stationary jaw member of the clip to which it is opposed.

It will be understood that, as shown in Figs. 1 and 2, the gripper loop 27 may be utilized to releasably hold an envelope E or the like in supported engagement with the back frame or bracket 25. The gripper loop 35, on the other hand, may be utilized to releasably hold an empty film spool or reel R, or other desired object, in supported engagement with the legs 11 of the stationary jaw member of the clip by which the film strip F removed therefrom is suspended. It will be understood that in racks or hangers wherein its use is not desired, the lower gripper loops 35 may be eliminated.

Having now described my invention, I claim:

1. A holding clip comprising a substantially flat member, a second member pivotally connected to said flat member on an axis lying substantially in the plane of said flat member, said pivotal axis being located substantially medially of both members, cooperating jaws provided on both members at one side of said pivotal axis, the portion of said second member located at the opposite side of the pivotal axis from the jaw thereof being adapted to constitute a manipulating portion and being divergent from the corresponding portion of said flat member when both jaws are closed and being free to cross the plane of said flat member when the jaws are opened, and spring means coupled to said flat member at a location spaced from the said pivotal axis and at the side thereof opposite to the jaw and also coupled to the manipulating portion of said second member at a location more distant from said pivotal axis than the coupling to the flat member, said spring means being so constructed and arranged as to be adapted to exert tensional force in a direct line through its couplings to said members, the freedom of movement of said members between closed and open jaw positions being such that the line of force of said spring means may oscillate through a dead center plane defined by said pivotal axis and the location of the coupling between said spring means and said flat member, which said dead center plane substantially coincides with the plane of said flat member, all whereby said spring means will be placed under increased tension when passing through said dead center plane during jaw opening and closing movements and will tend to resist movement of the manipulating portion of said second member from one side of the plane of said flat member to the other.

2. A holding clip as defined in claim 1, wherein the flat member is U-shaped with its interconnecting transverse portion forming the jaw thereof and wherein the said second member is so constructed and arranged that its manipulating portion is movable between the side legs of the said flat member and has stop means for restricting the degree of oscillating movement across the plane of said flat member when opening the jaws.

HENRY F. RUSCHMANN.

REFERENCES CITED

The following references are of record in the file of this patent:

UNITED STATES PATENTS

| Number | Name | Date |
| --- | --- | --- |
| 562,334 | Morton | June 16, 1896 |
| 784,070 | Rhoads | Mar. 7, 1905 |
| 869,774 | Freiman | Oct. 29, 1907 |
| 1,891,494 | Baltzley | Dec. 20, 1932 |
| 2,425,603 | Dye et al. | Aug. 12, 1947 |
| 2,428,511 | Braddy | Oct. 7, 1947 |

FOREIGN PATENTS

| Number | Country | Date |
| --- | --- | --- |
| 472,988 | Germany | Mar. 8, 1929 |
| 546,937 | Germany | Mar. 17, 1932 |